March 19, 1968 W. P. HANF ET AL 3,374,466

DATA PROCESSING SYSTEM

Filed May 10, 1965 2 Sheets-Sheet 1

INVENTORS
WILLIAM P. HANF
KARL K. WOMACK
BY Ronald J. Clark
ATTORNEY

March 19, 1968 W. P. HANF ET AL 3,374,466

DATA PROCESSING SYSTEM

Filed May 10, 1965 2 Sheets-Sheet 2

United States Patent Office 3,374,466
Patented Mar. 19, 1968

3,374,466
DATA PROCESSING SYSTEM

William P. Hanf, Endicott, and Karl K. Womack, Endwell, N.Y., assignors to International Business Machines Corporation, Armonk, N.Y., a corporation of New York Filed May 10, 1965, Ser. No. 454,325
8 Claims. (Cl. 340—172.5)

ABSTRACT OF THE DISCLOSURE

The present invention encompasses a data processing system universally designed so as to operate in response to first programs in a natural mode of operation and to second programs in a substituted mode of operation. Control word groups are stored in a first storage means to cause the data processing system to emulate an entirely different second processing system. An unnatural program designed for said second data processing system is executed by said universally designed data processing system by compatibility in character manipulation, hardware availability, address translation and operation code recognition.

Figure 1:
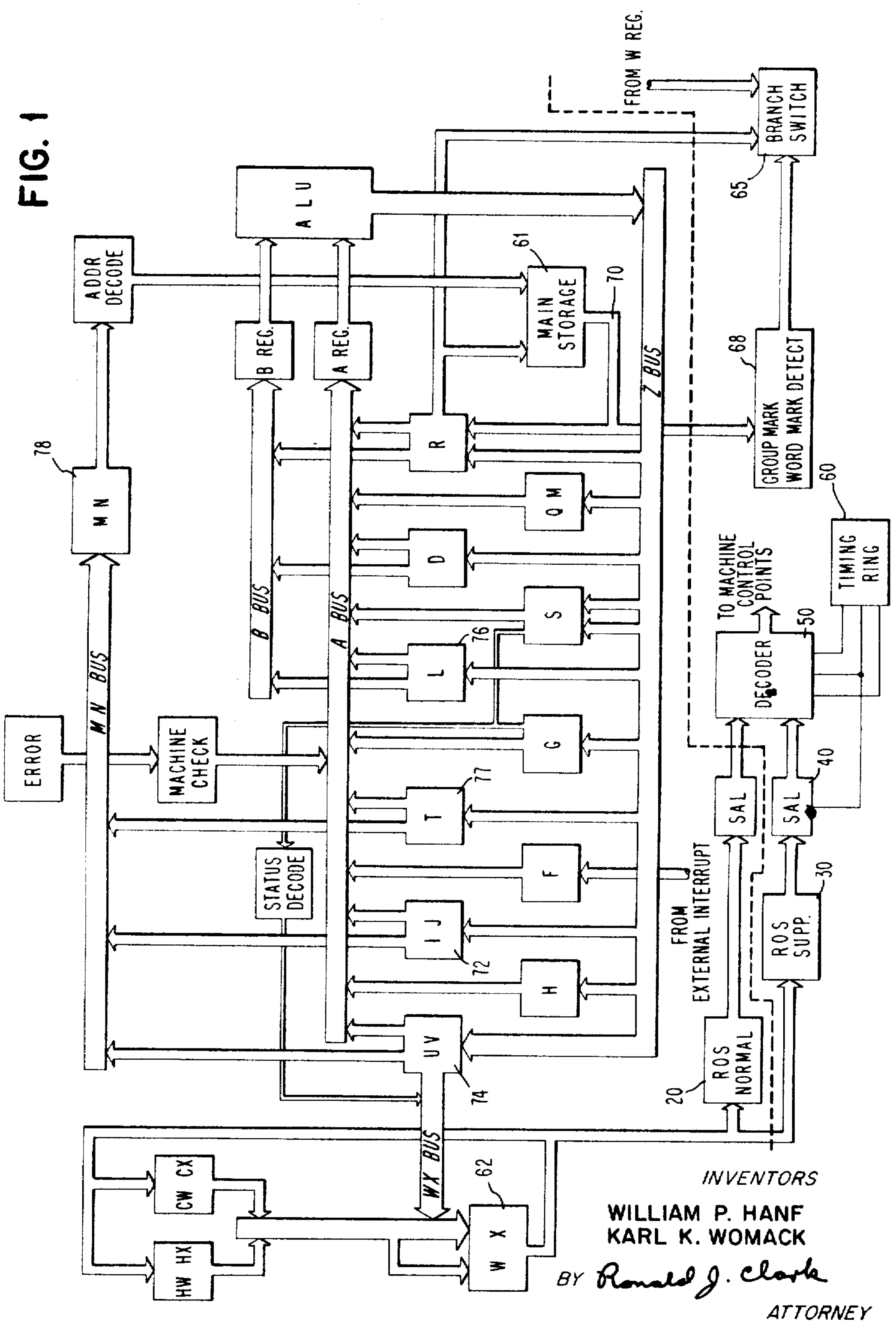

The present invention relates to electronic data processing systems and, more particularly, to a processor operating with completely different machine organizations.

The philosophy of data processing systems is self-controlled performance of procedures carried to various degrees. Any such self-controlled performance simply includes a series of actions or movements, each depending on another and requiring no operator intervention in the completion of the series. The series can be very short or very long. This series can be completely sequential, or the next action to be taken can be chosen by the last action completed. Generally, the series of steps performed by electronic processing equipments is called a program.

This program controls the entire flow of data in and out of various processing units. If, for instance, original data are punched into cards, the program controls the reading of this data, its transport to various processing areas for addition, subtraction, multiplication, division, modification, classification, recording and any other kind of action to which data can be subjected.

A data processing system is a group of various interconnected mechanical and electronic components. A system of this kind must be able to handle and execute such a program. The concept of stored programming provides this flexibility and efficiency.

In such a stored programmed computer, all the instructions needed to complete the procedure are written in the form of program steps. These program steps are made available to the machine by various methods, the most common of which is punched cards. The data processing system then stores these program steps in some kind of medium. Thus, when a procedure is to begin, the stored program is loaded into the system and the entire procedure can thereafter be completely performed by access to the medium and executing each step in the series.

Generally, each procedure which the electronic data processor is to perform is described in an entirely different series of steps. This series of steps is dictated by a plurality of variables, two of which are the hardware available within the data processor and the character configuration employed. Generally, one particular procedure may be implemented by several distinct series of steps. Any one of which is slightly different from the other. However, the function to be performed is the same and one series of steps is superior to the other only insofar as less total machine time is employed in performing the particular procedure. The program written to maximize the capability of the electronic data processor in which the program is to run and to minimize the total machine time required to run the program is defined as the natural mode of operation of the associated electronic data processor. Therefore, any program written for a particular processor can be written in the natural mode of operation of that processor.

Each time a new processing system is introduced, the problem is always raised whether the new processing system will operate with the programs written for the natural mode of operation of the old processing system. Quite naturally a new processing system includes new hardware units and new concepts of data flow which are not found in the previous data processing machines. Therefore the programs written for the replaced machines are not operable as the natural mode of operation of the new machine.

Two principal aids have evolved whereby the advanced electronic data processor can be employed to operate on the programs written for the replaced processing units. Program translation between computer codes is the ideal solution if complete translation can be accomplished, however translation has been slow in developing and although interest is high, the implementation effort has not yet produced a total translation. To data, manual intervention, human analysis, and recording are always necessary. The principal disadvantage of this technique results from the accepted premise that in order to utilize a new computer, total reprogramming to the natural mode of operation is required. Translation requires an intermediate phase of reprogramming just to make the program run on the system. Program simulation is a second method employed to run the old programs in the new systems; however, such simulations have been notoriously independent and traditionally slow, hence are only acceptable for obsolete programs.

In the past it was considered impossible to implement two completely different machine programs in one processor, without incurring exceptional cost and intolerable inefficiency. However, in the case of an electronic data processor employing read only storage, the advanced control ability of the ROS systems make manipulation of the processor data flow flexible enough to perform old programmed routines at a reasonable rate and reasonable speed. Although generally less efficient than a program written for the natural mode of operation of the new processor, the ability of operating the new processor according to the natural mode of operation of an old prcessor does offer an increase in speed over the old processor.

It is an object of the present invention to provide an electronic data processor capable of executing programs other than programs written in its natural mode of operation.

It is another object of the present invention to provide an electronic data processor capable of executing an unnatural program.

It is a further object of the present invention to provide an electronic data processor including a control circuit capable of performing character translation between the character representation needed for its natural mode of operation and the character representation employed in its substituted mode of operation.

It is another object of the present invention to provide an electronic data processor capable of emulating the operation of a second data processor.

It is still another object of the present invention to provide an electronic data processor which is capable of performing Op code translation to increase its efficiency.

According to these and other objects, the instant invention emulates in its own particular universal language the operation of a processor responsive to a different program language through compatibility in character manipulation, hardware availability, address translation and Op code recognition.

Although the character formats in the two processor languages differ, the universal character language employed by the instant invention can be employed to represent the character format used in the subordinate processor. Additionally, through novel techniques, the language differences can be employed to some advantage in new addressing techniques.

The instant invention employs a sufficient number of circuits whereby the function performed by individual units in the subordinate processor are assignable to available units.

Figure 2:
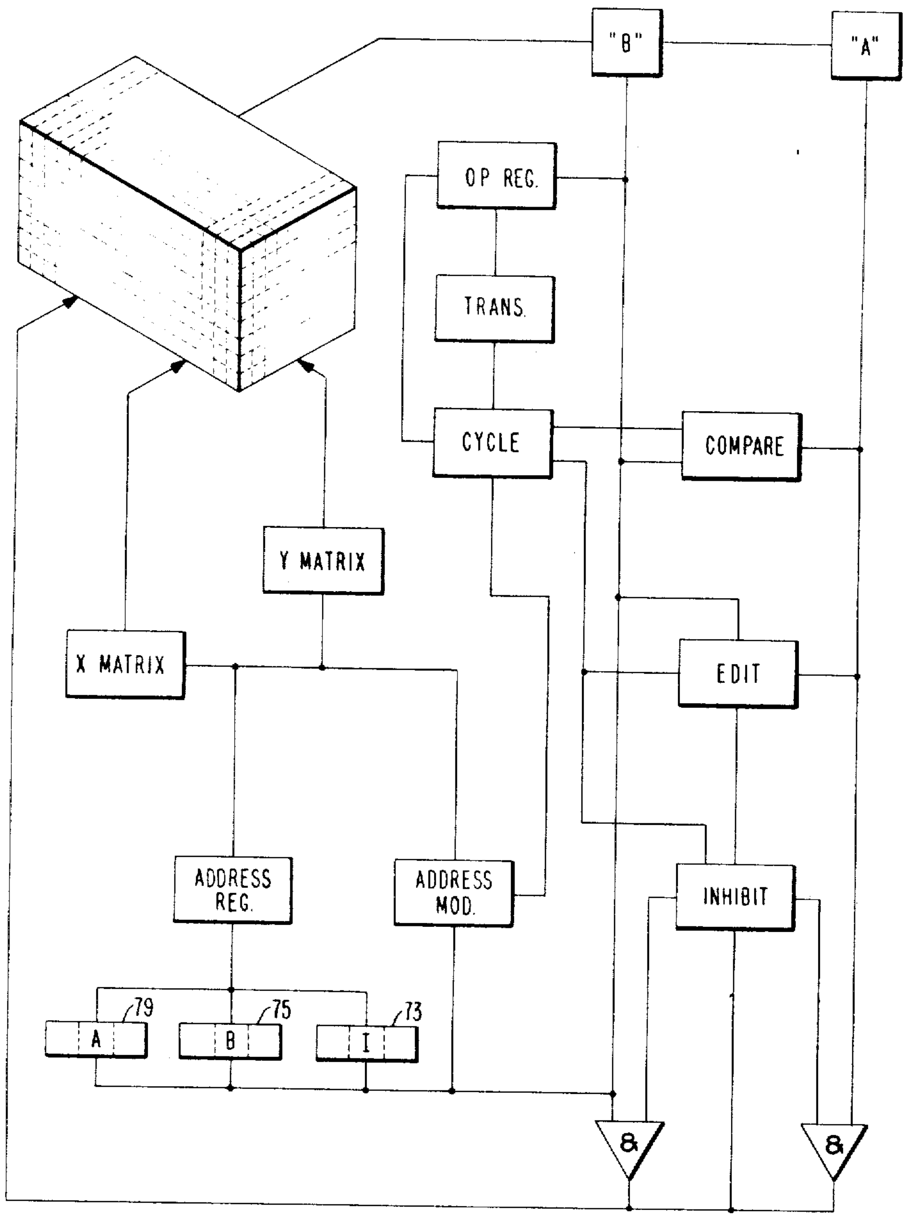

The foregoing and other objects, features and advantages of the invention will be apparent from the following more particular description of a preferred embodiment of the invention, as illustrated in the accompanying drawings; wherein FIG. 1 is a general block diagram of the instant invention; and FIG. 2 is a general block diagram of a subordinate processor selected for emulation.

Referring to FIG. 1, there can be seen a block diagram of the instant invention. The portion above the dotted line is compeltely described by Amdahl et al. in their U.S. patent application entitled "Data Processing System," filed April 6, 1964, Serial No. 357,372, assigned to the assignee of the present invention, and is also described by R. J. Carnevale et al. in their U.S. Patent No. 3,315,235 issued April 18, 1967, entitled "Data Processing System," and assigned to the assignee of the present invention. The portion below the line has been added. This added portion alters the functioning of the remaining circuits, and to that extend the description of the entire circuit is given.

READ ONLY STORAGE CONTROL

The address of a particular Read Only Storage (ROS) word is entered into the Read Only Address Register (ROAR) WX and a ROS cycle is started. While operating in its natural mode of operation, the WX register addresses the normal ROS area 20. However, while operating in its substituted mode of operation, the WX register addresses a supplemental ROS area 30. After the addressed word is read from storage into a sense amplifier latch (SAL) circuit 40, its contents are decoded in a decode circuit 50 and are used to activate various control points in the system data flow. A single ROS word is combined with a series of timing pulses from the timing ring 60 to control a series of steps in the substituted program. Such a sequence of ROS words is known as a microprogram. A particular ROS word also contains a portion of the address of the next ROS word to be executed. The remainder of the address is obtained from various machine conditions such as the condition of the adder carry latch. These allow branching on machine conditions. The address obtained is re-entered into the address register and a new cycle is started thereby allowing a definite sequence of ROS words to be executed.

A set of microprograms for each of the emulated operations is contained in the ROS circuit. A completely emulated move operation is shown in Appendix A followed by the descriptive micro-steps which they replace. The replaced micro-steps were executed by the processor shown in FIG. 2.

AUXILIARY STORAGE

The improved data processor operates in a substituted mode of operation paritally because of its versatility in construction and its adaptable control generating system. More particularly, the use of a read only storage philosophy of microprogramming as the basic control element provides a machine that is easily altered to operate in diverse ways. However, this system cannot automatically execute different machine programs, which programs were prepared for the natural mode of operation for different processors without certain connecting functions between the different programs. These connecting functions in the instant invention are performed by the contents of auxiliary storage which is part of main storage 61 shown in FIG. 1. Referring to Appendix B, the auxiliary storage area includes a decimal to binary address conversion table which converts the storage addressing system employed in the first processor to the storage addressing system employed in the improved processing system.

BCD to EBCDIC and EBCDIC to BCD character translate tables are also included in the auxiliary storage. These tables are employed in those circumstances wherein the use of the old processor language is necessary to perform the intended function. In this type of operation, the character is first translated into the old machine language, operated upon and re-translated to the newer machine language.

An operation code table is also stored in the auxiliary area, which table converts the operation codes employed in the older processor to a special form which materially aids in speeding up the operation of the improved processor. The table provides a means of recognizing these operations which require special addition during instruction cycles; for example, SET WORD MARK and STORE STAR. It also makes it easy to no-op any particular operation code or to make any operation code invalid.

Finally, the auxiliary storage area holds converted Input/Output (I/O) operation codes for the control of I/O equipment.

Referring again to FIG. 1, the supplementary ROS storage area 30 contains the micro programming necessary to control the operation of the instant invention during its substituted mode of operation. The processor can be placed into conditions to perform in the substituted mode of operation by turning on the W3 bit of the W register 62. This bit causes the supplementary ROS area to be addressed and controls all mode dependent functions. The W3 bit may be turned on for example from console switches.

The instant invention is prepared to operate in its substituted mode of operation by loading an initializing program ahead of the object program. The purpose of the initializing program is to load the conversion tables and address constants necessary to perform the substituted programs into the auxiliary storage area of the main storage. The initializing loading procedure also defines the characteristics of the system to be simulated for example, memory size, special features, and the I/O configuration.

CHARACTER CONFIGURATION

Characters in core storage of the processor operating in the substituted mode of operation are represented in extended binary coded decimal interchange code (EBCDIC) configuration. The field definition capability of the old processing system is carried over to the present invention, but is implement in a different manner. In binary coded decimal (BCD) a single character has been designated as the word mark (WM) for defining an end of field. In EBCDIC code, bit 1 of the byte is left on for those characters not having word marks. If a word mark is associated with the character being processed, it is represented by having the bit 1 of the byte off. Appendix C contains a complete BCD to EBCDIC translation table. The character A without a word mark is represented as 1100 0001 in EBCDIC, while the character A with a word mark is represented as 1000 0001 in EBCDIC.

The internal code used inthe instant invention while operating in the substituted mode of operation is the EBCDIC. Occasionally a translation of character codes from EBCDIC to BCD and back again is necessary to process certain of the Op codes written for the subordinate processor, such as a bit test, in the instant invention.

Most conversions are done through a table lookup procedure, utilizing the aforementioned tables in the auxiliary storage area. These tables are read into storage as part of the initializing routine that is loaded into storage head of the subordinate processor object program.

To illustrate the use of the table using the local storage map shown in Appendix B, a character is converted from EBCDIC to BCD. The character "C" in EBCDIC is a C3 (Hexidecimal) with a word mark (WM) or 83 without a word mark (WM). By checking the EBCDIC to BCD table for C3, a 33 or 0011 0011, is taken from the MPXI section.

In utilizing the conversion tables, if a word mark indicia is present with the character, the micro program eliminates it from the character before the table lookup is done to convert the character. In the EBCDIC to BCD conversion table, 0100 0000 configuration read out of the table is detected as an invalid BCD configuration, and will read out as a blank in BCD.

SYSTEM ADDRESSING

The subordinate processor's object program or programs are loaded into the upper storage locations of the main storage area in the instant invention. As previously mentioned, the instant invention uses a conversion table in the local storage and MPXI areas of auxiliary core storage to convert BCD addresses to binary addresses. This table also includes a storage bias constant to cause the subordinate processor's addresses to address the upper storage in the instant invention, the dominant processor, lines A, B, C, and S in Appendix B. The storage bias constant is a number equal to the storage size of the dominant processor minus the subordinate processor's storage size. To illustrate this procedure assume that a subordinate object program written for four thousand positions of storage is to be executed on a dominant processor having sixteen thousand, three hundred and eighty-four positions of storage. The storage bias constant is: 16,384 minus 4,000, equals 12,384, which difference is represented in hexadecimal as 3060.

In the given example of storage bias 3060, the result is further broken down to the following: the "30" is the bias for the high-order byte of the address, and the "60" is the bias for the low-order byte of the address. The storage may shown in Appendix B refers to the high-order bias as "Z," and the low-order bias as "Y."

When the dominant processsor's instruction cycles read out the subordinate processor's system addresses and converts them to binary addresses, the instruction cycles interrogate the hundreds digit in two occasions, since the hundreds digit affects the value stored in both the high-order byte of the address and the low-order byte of the address. For example, hundreds 3 inserts 0000 0001 in the high-order byte, line S, and 0010 1100 in the low-order byte. The following example shows the formation of the A STAR address during instruction cycles for a subordinate processor instruction ∠122.

The micro program reads out the hundreds position of the subordinate processor's instruction, in this case a 1. Next, an address is formed to address local storage. The micro program uses the hundreds digit to form bits 4–7 of the address, and since this is the hundreds position, forces the bits, 0–3, to a 2 (hex). The resultant address 21 in Hex is used to address local storage. Position 21 in local storage brings out a C4 (Hex). C4 represents the Y bias 60 plus the binary equivalent of 100 (64 in hex). If the same address, 21, is now used to address the MPXI portion of local storage, it will bring out the high-order byte of the address being formed. In this case, the address 21 brings out a 30. The 30 represents the Z bias plus 00 hundreds. At this point the micro program has developed the address 30C4 (hex). Now the micro program forms an address of OX, where X is the units digit of the subordinate program address. In this case the address is 02 (Hex). Addressing local storage with 02 brings out 02, which is added to the 30C4 already stored, giving a new value of 30C6. Finally, the micro program processes the tens position of the subordinate processor address by forcing a constant of 1 in the high-order of the local storage address and inserting the tens digit of the subordinate address processor in the low order of the byte. In this case, 12 is formed to address the tens conversion table, bringing out a 14 (Hex). This is added to 30C6. The result, 30DA, is inserted into the UV registers. The micro program tests to see if it is forming an A field address, and if so, the micro program takes the contents of the UV register and inserts it into the LT register. Zone bits in the hundreds and units position of the subordinate processor's addresses are tested for by the micro program and are not found in the address conversion tables.

OP CODE RECOGNITION

The subordinate processor Op codes in their EBCDIC configuration would require extensive interrogation by the micro-program to determine exactly what the Op code is, since their EBCDIIC bit configurations would not readily indicate what type of Op code the machine is handling. To make Op codes of the substituted processor more easily identified as to the type, a table of these Op codes is placed in local storage, lines M, N, O, and P, of Appendix B. This table groups similar Op codes together. The bit configurations are bit sensitive for easy identification by the micro-program.

The addressing technique of the Op code table in the local storage can be understood by first referring back to the EBCDIC to BCD character translation table shown in Appendix C. Then, if the bit 0 of all BCD characters in the subordinate system are code set that did not have a bit 0 on, are forced on, the charcters in EBCDIC with their bit 0 off can be overlayed with the rest of the EBCDIC characters. The only exceptions are blank, +, and —, which are not valid Op code characters in the subordinate system Op code set.

When the micro program reads out the Op code in EBCDIC form, it turns on the 0 and 1 bits of the Op code. Next, the EBCDIC character formed in the previous step is used to address local storage and remove the new character that is stored in the G-register. In the case of a blank, +, or —, the contents of the Op code table are ignored and the G register is forced to an invalvid Op code. The new character has a bit configuration that is more readily tested to tell the type of operation desired. The use of the Op code table can be illustrated by assuming that the Op code character read from the subordinate system object program is an Edit Op, E. The hexadecimal bit configuration of an E with a word mark indicia in EBCDIC is 85. Forcing on the bits 0 and 1 changes the configuration to C5. Using C5 to address the Op code table in local storages, a 16 is read out and stored in the G register. The 16 is bit sensitive to the micro program as an edit Op code. Any invalid EBCDIC Op code configuration addressing the Op code table brings out a 34 byte that is recognized by the micro program as an error.

BRANCHING

The instant invention is equipped with a branching capability which is shown in the following table.

| Branch Command | | Branch Indicia |
|---|---|---|
| CH field | CL field | |
| | 0110 | R1 |
| 1000 | | R2 |
| | 1100 | R3 |
| 0011 | | GMWM |

The R1, R2, and R3 branches are made from the contents of the R-register and are illustrated in FIG. 1 by a branch switch circuit 65. These branches can be given in the cycle immediately following a read cycle. A GMWM latch circuit 68 detects a GMWM on the storage sense bus 70 when a read cycle occurs. The GMWM latch feeds the stat use decoder and remains latched on until the next read call is given to core storage.

FIG. 2 shows a schematic diagram of the subordinate processor emulated by the instant invention. This subordinate processor is described in a U.S. Patent 3,077,580 to F. O. Underwood and in an IBM Instruction Manual, form No. 225-6540-0, copyright 1960.

When the instant invention is emulating the subordinate processor shown in FIG. 2 and is operating in a substituted mode of operation, an IJ register 72 performs the functions of an I STAR register 73, and an UV register 74 performs the functions of a B STAR register 75. Hardware is provided so that L and T registers, 76 and 77 respectively, may be gated as a pair into an MN register 78 when the T register 77 is named as the source. The L and T registers perform the function of an A STAR register 79 in the subordinate processor.

While the invention has been particularly shown and described with reference to a preferred embodiment thereof, it will be understood by those skilled in the art that various changes in form and details may be made therein without departing from the spirit and scope of the invention.

*Operation Code of Subordinate Processor*
*Move Numerical*

| Mnemonic | Op Code | A-Address | B-Address |
|---|---|---|---|
| MN | D | XXX | XXX |

*Function*

The numerical portion (8-4-2—1 bits) of the single character in the A-address is moved to the B-address. The zone portions (A–B bits) are undistrubed at both addresses.

*Micro-Program for Emulating Operation Code*

1. Read and decode the Op Code.
2. Read the A and B addresses and convert them to the proper binary values.
3. Move the numeric bits located at the A-address to the B-address.
4. Perform all required tests, such as for proper instruction format, character and address validity; etc.

| Ref. No. | Address | Statement and Function |
|---|---|---|

QEØØ1 JD — 1100 —
IJ MEM
Read one byte from storage using the address in IJ.
G=J+0+1
Increment the J portion of the address and place it in G.
S2=ANSNZ
Make S2=1 if J+1 is not zero.

JE — 11CD —
AC,R1
Branch as follows:

| Adder Carry | R1 | Go to |
|---|---|---|
| No | 0 | LF |
| Yes | 0 | JF |
| No | 1 | E |
| Yes | 1 | GF |

(An adder carry indicates that the result of J+1 called for in the previous step exceeds the capacity of the J register and either step JF or step GF will be taken to add 1 to the I register.)
(If R1=1 it indicates that the character just read did not have a word mark, which would be incorrect as it should be an op code.)
WRITE
Regen. storage.
J=R$K12H
Or the contents of the R register (1401 op code) with 1100 0000 and place the result in J.
S5=LZ
Make S5=1 if bits 4, 5, 6 & 7 at the ALU output are zero.

| Ref. No. | Address | Statement and Function |
|---|---|---|

LF — 1170 —
R0,S5
Branch as follows:

| R0 | S5 | Go to |
|---|---|---|
| 0 | 0 | JH |
| 1 | 0 | NH |
| 0 | 1 | LH |
| 1 | 1 | QH |

(The 1401 op code, presently in the R register is 1000 0100—thus R0+1 and S5+0 and the branch is taken to NH.)
IJ CPU
Read a byte from CPU bump using address in IJ. (An op code table, stored in the CPU bump for 1401 mode, is used to convert the op code. The 1000 0100 is changed to 0001 0010.)
J=G
Move the contents of the G register to J.
S0=0
Turn off S0 if it was on.

NH — 11F2 —
R0,R1
Branch as follows:

| R0 | R1 | Go to |
|---|---|---|
| 0 | 0 | QEØ11 NB |
| 1 | 0 | QEØ11 JB |
| 1 | 1 | QEØ11 GB |

(The op code table contains no characters with the bit configuration 01.)
WRITE
Regen. storage.
G=R
Move the contents of the R register to G.
S4,S5=HZ,LZ
Make S4=1 if the high 4 bits of Z are zero, set S4 to 0 otherwise—make S5=1 if the low 4 bits of Z are zero, set S5 to 0 otherwise (as Z=0001 0010 both S4 and S5 will be set to 0).
X,S5
Branch to QD if S5=1, ND if S5=0.

QEØ11 NB — 110C —
IJ MEM
Read a byte from main storage using the address in IJ (reads hundreds position of A-address).
JC=J+0+1
Increment the J register by 1, store any carry in S3.

ND — 111A —
R0,R1
Branch as follows:

| R0 | R1 | Go to |
|---|---|---|
| 0 | 0 | LG |
| 0 | 1 | QG |
| 1 | 0 | NG |
| 1 | 1 | JG |

(Assuming the A-address is valid R0 and R1 should be 11).
WRITE
Regen. memory.
IC=I+0+C
Increment the I register if the carry latch (S3) is on.

JG — 111F —
R2,R3
Branch as follows:

| R2 | R3 | Go to |
|---|---|---|
| 0 | 0 | LJ |
| 0 | 1 | JJ |
| 1 | 0 | GJ |
| 1 | 1 | EJ |

(This is a branch on the zone bits over the hundreds position of the address, assuming a numeric address—000 to 999—bits 2 and 3 will be 11.)
IJ MEM
Read a byte from main storage using the address in IJ (reads tens position of A-address).
V=RL+K2H
Add the low 4 bits in the R register to 0010 0000 and place the result in V.
S6=0
Turn off S6 if it was on.

EJ — 112F —
R0,R1
Branch as follows:

| R0 | R1 | Go to |
|---|---|---|
| 0 | 0 | QEØ31 EB |
| 0 | 1 | QEØ31 JB |
| 1 | 0 | QEØ31 GB |
| 1 | 1 | QEØ31 LB |

(This tests for validity and special characters, the bits for the present op code should be 11.)
WRITE
Regen. memory.
U=RXH+0
Cross the low four bits of R to the high 4 bit positions and place in U.

Ref. No. — Address — Statement and Function

QEØ31 LB — 1137 — R2,R3

Branch as follows:

| R2 | R3 | Go to |
|---|---|---|
| 0 | 0 | GD |
| 0 | 1 | JD |
| 1 | 0 | LD |
| 1 | 1 | ND |

(This is a branch on the index bits in the A-address—assuming no indexing R2, 3 will be 11.)

UV CPU

Read a byte from CPU bump using the address in UV. (This reads a byte from the low hundreds table to be used in converting the decimal 1401 address to a binary 360 address—V low contains the value in the hundreds position of the A-address.)

D=0+0

Set the D register to zero.

ND — 1143 — X,S5

Branch to QE if S5=1.

WRITE

Regen. memory.

DC=RX+D

Cross the low 4 bits of R with the high 4 bits, add the result to the contents of D and place the sum in D. Store any carry in the carry latch (S3).

NE — 15DA — S0,X

Branch to LF if S0=1.

UV UCW

Read a byte from UCW bump using the address in UV (this reads the high hundreds address conversion byte).

J=J+0+1

Increment the J register by 1.

NF — 15DC — AC,X

Branch to LH on adder carry.

WRITE

Regen. memory.

V=UXL+K1H

Cross the high 4 bits of U to the low 4 bits and add to 0001 0000, place the result in V.

S7=0

Set S7 to zero.

NH — 15DD — S4,X

Branch to QEØ51 NB if S4 is on.

IJ MEM

Read a byte from main storage using the address in IJ (units digit of A-address).

UC=UL+R+C

Add the contents of R (High hundreds conversion byte) to the low four bits of U, using carry from the carry latch, place the result in U and carry into the carry latch.

QEØ51 JB — 15E4 — R2,R3

Branch as follows:

| R2 | R3 | Go to |
|---|---|---|
| 0 | 0 | CD |
| 0 | 1 | ND |
| 1 | 0 | GD |
| 1 | 1 | JD |

This tests the zone bits over the units digit of the A-address, assuming a numeric address (000–999) these bits will be 11.

WRITE

Regen. memory.

AC FORCE

Branch to QD on Adder Carry.

DC=D+RL

Add the contents of D to the low 4 bits of R and place the results in D. Store any carry in S3.

JD — 1577 — RØ,X

Branch to NG if RØ=Ø.

STORE

Disregard data coming from memory if any.

VC=U+Ø+C

Add carry from previous addition to the U register.

JG — 15F6 — AC,R1

Branch as follows:

| Adder Carry | R1 | Go to |
|---|---|---|
| No | 0 | QEØ61 GC |
| No | 1 | QEØ61 JC |
| Yes | 0 | QEØ61 EC |
| Yes | 1 | QEØ61 CC |

Tests for address validity.

UV CPU

Read a byte from CPU bump using the address in UV (reads the tens conversion byte).

JC=J+0+1

Increment the J register, store carry in carry latch (S3).

Ref. No. — Address — Statement and Function

QEØ61 JC — 15E9 — AC,R3

Branch as follows:

| Adder Carry | R3 | Go to |
|---|---|---|
| No | 0 | NE |
| No | 1 | GE |
| Yes | 0 | LE |
| Yes | 1 | JE |

This tests for address validity and the need for incrementing the I register.

WRITE

Regen. memory.

VC=RX+D

Cross the low 4 bits of R with the high 4 bits, add the result to D and place the sum in V with any carry in the carry latch.

NE — 1198 — S2,S3

Branch as follows:

| S2 | (Carry S3 Latch) | Go to |
|---|---|---|
| 0 | 0 | NG |
| 0 | 1 | QG |
| 1 | 0 | LG |
| 1 | 1 | JG |

Tests for end of A or B-address and for the need to increment U.

IJ MEM

Read a byte from main storage using the address in IJ (hundreds position of B-address).

JC=J+0+1

Increment the J register, place carry in carry latch (S3).

LG — 119E — S4,R1

Branch as follows:

| S4 | R1 | Go to |
|---|---|---|
| 0 | 0 | QEØ71 CB |
| 0 | 1 | QEØ71 JB |
| 1 | 0 | QEØ71 EB |
| 1 | 1 | QEØ71 GB |

S4 was set to 0 at QEØØ1 NH for word mark.

WRITE

Regen. memory.

T=V

Move the contents of the V register to T.

QEØ71 — 11A5 — R0,S3

Branch as follows:

| R0 | (Carry S3 Latch) | Go to |
|---|---|---|
| 0 | 0 | NC |
| 0 | 1 | LC |
| 1 | 0 | GC |
| 1 | 1 | JC |

Tests for a special character and the need to increment I.

LC=U

Move the contents of the U register to L, STORE any carry in S3.

S2=0

Set S2 to zero.

GC — 11AE — R2, R3

Branch as follows:

| R2 | R3 | Go to |
|---|---|---|
| 0 | 0 | QEØ11 LJ |
| 0 | 1 | QEØ11 JJ |
| 1 | 0 | QEØ11 GJ |
| 1 | 1 | QEØ11 EJ |

Performs the same branch as step QEØ11 JG on hundreds position of B-address.

IJ MEM

Read a byte from main storage using the address in IJ.

V=RL+K2H

Same as step QEØ11 JG.

S7=0

Turn off S7.

The micro program now returns to step QEØ11 EJ and the following steps are repeated to convert the B-address to binary (assuming a numeric address without indexing).

QEØ11 EJ
QEØ31 LB
QEØ31 ND
QEØ31 NE
QEØ31 NF
QEØ31 NH
QEØ51 JB
QEØ51 JD
QEØ51 JG
QEØ61 JC
QEØ61 NE

At this point S2=0 and the branch is taken to NG.

| Ref. No. | Address | Statement and Function |
|---|---|---|
| NG | 119C | S4,R1<br>Branch as follows: |

| S4 | R1 | Go to |
|---|---|---|
| 0 | 0 | QEØ81 JB |
| 0 | 1 | QEØ81 GB |
| 1 | 0 | QEØ81 CB |
| 1 | 1 | QEØ81 EB |

| Ref. No. | Address | Statement and Function |
|---|---|---|
| | | S4=0, branch on R1 is test for word mark. As the character just read is the op code of the next instr. a work mark should be present and R1 should be 0.<br>WRITE<br>Regen. memory.<br>IC=I+0+C<br>Increment I if the carry latch is on, insert any resulting carry in the carry latch. |
| QEØ81 | 11B8 | JC=J−0<br>Decrement J by 1.<br>S0=0<br>Set S0 to 0. |
| JD | 11CA | G2,G3<br>Branch as follows: |

| G2 | G3 | Go to |
|---|---|---|
| 0 | 0 | QE411 CB |
| 0 | 1 | QE411 JB |
| 1 | 0 | QE411 EB |
| 1 | 1 | QE411 GB |

| Ref. No. | Address | Statement and Function |
|---|---|---|
| | | G contains the converted op code (0001 0010 for Move Numeric) G2G3=01.<br>W=K0<br>Set bits 4, 5, 6, 7 of W to zero.<br>IC=I−0+C<br>Adjust the I register if necessary as a result step JB. |
| QE411 JB | 1071 | S6,S7<br>Branch as follows: |

| S6 | S7 | Go to |
|---|---|---|
| 0 | 0 | JD |
| 0 | 1 | LD |
| 1 | 0 | ND |
| 1 | 1 | QD |

| Ref. No. | Address | Statement and Function |
|---|---|---|
| | | Branch on invalid A-address, B-address or both.<br>K1 CPU<br>Read byte 1 of K addressable CPU bump.<br>R=J<br>Move the contents of the J register to R. |
| JD | 107C | G6,G5<br>Branch as follows: |

| G6 | G5 | Go to |
|---|---|---|
| 0 | 0 | QE461 LB |
| 0 | 1 | QE451 EB |
| 1 | 0 | QE451 LB |
| 1 | 1 | QE461 EB |

| Ref. No. | Address | Statement and Function |
|---|---|---|
| | | Continue op code branch.<br>STORE<br>Store R (contents of J) in K addressable CPU bump byte 1. |
| QE461 LB | 10EE | G4,G7<br>Branch as follows: |

| G4 | G7 | Go to |
|---|---|---|
| 0 | 0 | JF |
| 0 | 1 | LF |
| 1 | 0 | NF |
| 1 | 1 | QF |

| Ref. No. | Address | Statement and Function |
|---|---|---|
| | | Continue op code branch.<br>LT MEM<br>Read a byte from main storage using the address in LT.<br>TC=T−0<br>Decrement T by 1.<br>S4,S5=0<br>Set S4,S5 to zero. |
| JF | 1084 | WRITE<br>Regen. memory.<br>W=K4<br>Set the W register to 0100.<br>J=R$K4H<br>Or the contents of the R register with 0100 0000 and place the result in J.<br>S6=0<br>Set S6 to zero. |
| QF411 QA | 1417 | S6,X<br>Branch to NB if S6=1, QB if S6=0.<br>IJ UCW<br>Read a byte from UCW bump using the address in IJ (for conversion from NPL to BCD).<br>D=R<br>Move the contents of the R register (character at A-address in NPL code) to D.<br>S2=0<br>Set S2 to zero. |
| QB | 1421 | WRITE<br>Regen. memory.<br>G=RL+K4H<br>Add the low four bits of R to 0100 0000 and place the result in G. |
| QC | 1422 | UV MEM<br>Read a byte from main storage using the address in UV (B field).<br>LC=L−0+C<br>Decrement the value in L. |
| QD | 143C | WRITE<br>Regen. memory.<br>J=R$K4H<br>Or the contents of R with 0100 0000 and place the result in J. |
| QE | 1425 | S6,X<br>Branch to NF if S6=1, QF if S6=0.<br>IJ UCW<br>Read a byte from UCW bump using the address in IJ (NPL to BCD conversion byte).<br>Z=R*K4H<br>AND the contents of R with 0100 0000 and place the result on Z bus.<br>S2=ANSNZ<br>Set S2 to 1 if the Z bus is not zero. |
| QF | 1428 | WRITE<br>Regen. memory.<br>J=G$RH<br>OR the contents of the G register with the high 4 bits of R and place the result in J. |
| QG | 142C | IJ CPU<br>Read a byte from CPU bump using the address in IJ (BCD to NPL conversion byte). |
| QH | 1453 | S2,X<br>Branch to NJ if S2=1, QJ if S2=0.<br>WRITE<br>Regen. memory. |
| NJ | 142B | UV MEM<br>Read a byte from main storage using the address in UV.<br>VC=V−0<br>Decrement the value in V.<br>S6=0<br>Set S6 to zero. |
| LJ | 1437 | STORE<br>Store the value in R at the location addressed on the previous step.<br>W=K1<br>Set bits 4, 5, 6, 7 of the W register to 0001.<br>UC=U−0+C<br>Adjust the value in U if required as a result of decrementaing V in previous step. |
| QEØØ1 QD | 1119 | K1 CPU<br>Read byte 1 of K addressable CPU bump.<br>S=SL<br>Set bits 0-3 of S to zero. |
| QE | 1109 | X,INT<br>Branch to GD if interrupt is waiting.<br>Write<br>Regen. memory.<br>J=R<br>Move the contents of R to J. |

SUBORDINATE MOVE OP CODE

Objectives of A-cycle:

(1A) Read into A- and B-registers from storage.
(2A) Transfer B-register back into storage (A-field).
(3A) Reduce A-field address by one.

*Objectives of B-cycle:*

(1B) Address the B-field.
(2B) Read the B-field character into the B register.
(3B) Transfer the zone portion of the B-register back into storage.
(4B) Transfer the digit portion of the A-register into storage (B-field).
(5B) Maintain correct odd-bit parity.
(6B) Reduce the B-field address by one.
(7B) End execute-phase after one A- and one B-cycle.

*Circuit Description*

(1A) *A- and B-Register Read-In.*—The B-register latches reset at time 000–015 and are set with a sense output from storage on all cycles, provided that storage is activated. The A-register latches are set by:

(a) Time 045–075
(b) A-cycles, and
(c) B-register output.

(2A) *Transfer the B-Register.*—Not WM set operation, not WM clear operation, not store operation, and A-cycles are switched together to activate transfer B-register. This line energizes all the inhibit control lines necessary to transfer the entire contents of the B-register back into storage.

(3A) *Reduce the A-Field Address by one.*—Refer to Address Register Modification.

(1B) *Address the B-Field.*—The B-star is gated into the storage address register.

(2B) *Read the B-Field Character into the B-Register.*—The B-register resets at time 000–015 and is set by the sense lines from the storage unit on all storage cycles. The A-register retains the A-field character because it is not reset on B-cycles.

(3B) *Transfer the B-Register Zone back into storage.*—Move digit operation activates the B-register zone inhibit line. This line gates the zone portion of the B-register onto the inhibit lines. A WM in the B-field is treated the same as a zone bit; it is transferred from the B-register back into storage. B-register WM inhibit is activated.

(4B) *Transfer the digit portion of the A-Register back into storage.*—A-Reg. Digit Inhibit is energized by Not Block Operation and B-cycles and Move Digit Opr. This gates the digit portion of the A-register onto the inhibit lines.

(5B) *Maintain correct Odd-Bit parity.*—This is accomplished by the C-bit generator.

(6B) *Reduce the B-Field Address by one.*

(7B) *End E-Phase after one A- and one B-Cycle.*—I/E Change is activated by one character I/E Change and B-cycles switched together. A move digit operation activates one character.

APPENDIX B

| | line | | | 0 | 1 | 2 | 3 | 4 | 5 | 6 | 7 | 8 | 9 | A | B | C | D | E | F |
|---|---|---|---|---|---|---|---|---|---|---|---|---|---|---|---|---|---|---|---|
| LOCAL STORAGE | A | UNITS | 0X | 00 | 01 | 02 | 03 | 04 | 05 | 06 | 07 | 08 | 09 | F0 | F3 | F4 | F5 | F6 | F7 |
| | B | TENS | 1X | 00 | (0A)X | (14)X | (1E)X | (28)X | (32)X | (3C)X | (46)X | (50)X | (5A)X | 10 | 10 | 10 | 10 | 10 | 10 |
| | C | HUNDS-LO | 2X | (60)X | (60+ 64)X | (60+ C8)X | (60+ 2C)X | (60+ 90)X | (60+ F4)X | (60+ 58)X | (60+ BC)X | (60+ 20)X | (60+ 84)X | 10 | 10 | 10 | 10 | 10 | 10 |
| | D | BIN DEC | 3X | 00 | 56 | 12 | 68 | 24 | 80 | 36 | 92 | 48 | 04 | 60 | 16 | 72 | 28 | 84 | 40 |
| | E | BCD TO EBCDI | 4X | 40 | F1 | F2 | F3 | F4 | F5 | F6 | F7 | F8 | F9 | F0 | 7B | 7C | 7D | 7E | 7F |
| | F | | 5X | 7A | 61 | E2 | E3 | E4 | E5 | E6 | E7 | E8 | E9 | E0 | 6B | 6C | 6D | 6E | 6F |
| | G | | 6X | 60 | D1 | D2 | D3 | D4 | D5 | D6 | D7 | D8 | D9 | D0 | 5B | 5C | 5D | 5E | 5F |
| | H | | 7X | 50 | C1 | C2 | C3 | C4 | C5 | C6 | C7 | C8 | C9 | C0 | 4B | 4C | 4D | 4E | 4F |
| | I | | 8X | | | | TAPE | | | | | 0 | 1 | 2 | 3 | 4 | 5 | 6 | 7 |
| | J | | 9X | | | | | | | | | 8 | 9 | 10 | 11 | 12 | 13 | 14 | 15 |
| | K | | AX | | | | WORKING STORAGE | | | | | 16 | 17 | 18 | 19 | 20 | 21 | 22 | 23 |
| | L | | BX | 00 | 96 | 92 | 88 | | | | | 24 | 25 | 26 | 27 | 28 | 29 | 30 | 31 |
| | M | OP CODE TABLE | CX | ?)1C | A)18 | B)08 | C)1F | D)12 | E)16 | F)2A | 34 | H)B1 | 34 | 34 | ·)02 | *)15 | 34 | 34 | 34 |
| | N | | DX | ])1D | 34 | K)29 | L)90 | M)80 | N)06 | 34 | P)1E | Q)F1 | 34 | 34 | 34 | 34 | 34 | 34 | 34 |
| | O | | EX | 34 | /)05 | S)19 | 34 | U)20 | V)3A | W)3B | 34 | Y)13 | Z)17 | 34 | ')04 | %)1B | 34 | 34 | 34 |
| | P | | FX | 34 | 1)21 | 2)22 | 3)23 | 4)24 | 5)25 | 6)26 | 7)27 | 8)06 | 9)06 | 34 | #)14 | @)1A | 34 | 34 | 34 |
| MPX 1 STORAGE | Q | | 0X | 00 | 05 | 01 | 06 | 02 | 07 | 03 | 08 | 04 | 09 | | | | | | |
| | R | | 1X | | | | | | | | | | | | | | | | |
| | S | HUNDS-HI | 2X | 30 | 30+00 | 30+00 | 30+01 | 30+01 | 30+01 | 30+02 | 30+02 | 30+03 | 30+03 | | | | | | |
| | T | | 3X | | | | | | | | | | | | | | | | |
| | U | EBCDI TO BCD | 4X | 00 | 40 | 40 | 6B | 6C | 6D | 6E | 6F | 80 | 60 | 40 | 3B | 3C | 3D | 3E | 3F |
| | V | | 5X | 30 | 40 | 40 | 5B | 5C | 5D | 5E | 5F | 40 | 40 | 40 | 2B | 2C | 2D | 2E | 2F |
| | W | | 6X | 20 | 11 | 40 | 4B | 4C | 4D | 4E | 4F | 90 | 50 | 40 | 1B | 1C | 1D | 1E | 1F |
| | X | | 7X | 40 | 40 | 7A | 7B | 7C | 7D | 7E | 7F | 40 | 40 | 10 | 0B | 0C | 0D | 0E | 0F |
| | Y | | 8X | | | | | | | | | 0 | 1 | 2 | 3 | 4 | 5 | 6 | 7 |
| | Z | DISK STORAGE OPS | 9X | File Unit 0 Adder | Unit 0 Cyl | File Unit 1 Addr | Unit 1 Cyl | File Unit 2 Addr | Unit 2 Cyl | File Unit 3 Addr | Unit 3 Cyl | 8 | 9 | 10 | 11 | 12 | 13 | 14 | 15 |
| | AA | | AX | Cyl# 00 | Cyl# 32 | Cyl# 0A | Cyl# 3C | Cyl# 14 | Cyl# 46 | Cyl# 1E | Cyl# 50 | 16 | 17 | 18 | 19 | 20 | 21 | 22 | 23 |
| | BB | | BX | H | R | 00 | DL | DL | | | | 24 | 25 | 26 | 27 | 28 | 29 | 30 | 31 |
| | CC | EBCDI TO BCD | CX | 3A | 31 | 32 | 33 | 34 | 35 | 36 | 37 | 38 | 39 | E0 | 40 | 40 | 40 | 45 | 5C |
| | DD | | DX | 2A | 21 | 22 | 23 | 24 | 25 | 26 | 27 | 28 | 29 | D0 | 40 | 40 | 40 | 46 | 5D |
| | EE | | EX | 1A | 40 | 12 | 13 | 14 | 15 | 16 | 17 | 18 | 19 | C0 | 40 | 40 | 40 | 4F | 56 |
| | FF | | FX | 0A | 01 | 02 | 03 | 04 | 05 | 06 | 07 | 08 | 09 | F0 | 40 | 40 | 40 | 44 | 5F |

APPENDIX C

| BCD CODE | | | | | | | DEFINED CHARACTER GRAPHIC | | EBCDIC CODE | | | | | | | |
|---|---|---|---|---|---|---|---|---|---|---|---|---|---|---|---|---|
| C | B | A | 8 | 4 | 2 | 1 | | | 0 | 1 | 2 | 3 | 4 | 5 | 6 | 7 |
| C | | | | | | | | Blank | | 1 | | | | | | |
| | B | A | 8 | | 2 | 1 | . | Period | | 1 | | | 4 | | 6 | 7 |
| C | B | A | 8 | 4 | | | ⌑ ← | Lozenge (Left Arrow) | | 1 | | | 4 | 5 | | |
| | B | A | 8 | 4 | | | [ ( | Left Bracket (Parenthesis) | | 1 | | | 4 | 5 | | 7 |
| | B | A | 8 | 4 | 2 | | < ? | Less Than (Question Mark) | | 1 | | | 4 | 5 | 6 | |
| C | B | A | 8 | 4 | 2 | 1 | ≢ | Group Mark | | 1 | | | 4 | 5 | 6 | 7 |
| C | B | A | | | | | & | Ampersand | | 1 | | 3 | | | | |
| C | B | | 8 | | 2 | 1 | $ | Dollar Sign | | 1 | | 3 | 4 | | 6 | 7 |
| | B | | 8 | 4 | | | * | Asterisk | | 1 | | 3 | 4 | 5 | | |
| C | B | | 8 | 4 | | 1 | ] ) | Right Bracket (Parenthesis) | | 1 | | 3 | 4 | 5 | | 7 |
| C | B | | 8 | 4 | 2 | | ; | Semicolon | | 1 | | 3 | 4 | 5 | 6 | |
| | B | | 8 | 4 | 2 | 1 | Δ | Delta | | 1 | | 3 | 4 | 5 | 6 | 7 |
| | B | | | | | | - | Hyphen | | 1 | 2 | | | | | |
| C | | A | | | | 1 | / | Slash | | 1 | 2 | | | | | 7 |
| C | | A | 8 | | 2 | 1 | , | Comma | | 1 | 2 | | 4 | | 6 | 7 |
| | | A | 8 | 4 | | | % | Percent | | 1 | 2 | | 4 | 5 | | |
| C | | A | 8 | 4 | | 1 | ⋎ = | Word Separator (Equal Sign) | | 1 | 2 | | 4 | 5 | | 7 |
| C | | A | 8 | 4 | 2 | | \ | Reversed Slash | | 1 | 2 | | 4 | 5 | 6 | |
| | | A | 8 | 4 | 2 | 1 | ⧻ ! | Tape Segment (Exclamation) | | 1 | 2 | | 4 | 5 | 6 | 7 |
| | | A | | | | | ƀ | | | 1 | 2 | 3 | 4 | | 6 | |
| | | | 8 | | 2 | 1 | # | Pound Sign | | 1 | 2 | 3 | 4 | | 6 | 7 |
| C | | | 8 | 4 | | | @ | At Sign | | 1 | 2 | 3 | 4 | 5 | | |
| | | | 8 | 4 | | 1 | : | Colon | | 1 | 2 | 3 | 4 | 5 | | 7 |
| | | | 8 | 4 | 2 | | > " | Greater Than (Quote Marks) | | 1 | 2 | 3 | 4 | 5 | 6 | |
| C | | | 8 | 4 | 2 | 1 | √ | Tape Mark | | 1 | 2 | 3 | 4 | 5 | 6 | 7 |
| C | B | A | 8 | | 2 | | ? +0 | Question Mark (Plus Zero) | 0 | 1 | | | | | | |
| | B | A | | | | 1 | A | | 0 | 1 | | | | | | 7 |
| | B | A | | | 2 | | B | | 0 | 1 | | | | | 6 | |
| C | B | A | | | 2 | 1 | C | | 0 | 1 | | | | | 6 | 7 |

APPENDIX C—Continued

| BCD CODE | | | | | | | | DEFINED CHARACTER GRAPHIC | EBCDIC CODE | | | | | | | |
|---|---|---|---|---|---|---|---|---|---|---|---|---|---|---|---|---|
| | B | A | | 4 | | | D | | 0 | 1 | | | | 5 | | |
| C | B | A | | 4 | | 1 | E | | 0 | 1 | | | | 5 | | 7 |
| C | B | A | | 4 | 2 | | F | | 0 | 1 | | | | 5 | 6 | |
| | B | A | | 4 | 2 | 1 | G | | 0 | 1 | | | | 5 | 6 | 7 |
| | B | A | 8 | | | | H | | 0 | 1 | | | 4 | | | |
| C | B | A | 8 | | | 1 | I | | 0 | 1 | | | 4 | | | 7 |
| | B | | 8 | | 2 | | ! $\bar{0}$ | Exclamation Point (Minus Zero) | 0 | 1 | | 3 | | | | |
| C | B | | | | | 1 | J | | 0 | 1 | | 3 | | | | 7 |
| C | B | | | | 2 | | K | | 0 | 1 | | 3 | | | 6 | |
| | B | | | | 2 | 1 | L | | 0 | 1 | | 3 | | | 6 | 7 |
| C | B | | | 4 | | | M | | 0 | 1 | | 3 | | 5 | | |
| | B | | | 4 | | 1 | N | | 0 | 1 | | 3 | | 5 | | 7 |
| | B | | | 4 | 2 | | O | | 0 | 1 | | 3 | | 5 | 6 | |
| C | B | | | 4 | 2 | 1 | P | | 0 | 1 | | 3 | | 5 | 6 | 7 |
| C | B | | 8 | | | | Q | | 0 | 1 | | 3 | 4 | | | |
| | B | | 8 | | | 1 | R | | 0 | 1 | | 3 | 4 | | | 7 |
| | | A | 8 | | 2 | | ‡ + | Record Mark (Plus Sign) | 0 | 1 | 2 | | | | | |
| C | | A | | | 2 | | S | | 0 | 1 | 2 | | | | 6 | |
| | | A | | | 2 | 1 | T | | 0 | 1 | 2 | | | | 6 | 7 |
| C | | A | | 4 | | | U | | 0 | 1 | 2 | | | 5 | | |
| | | A | | 4 | | 1 | V | | 0 | 1 | 2 | | | 5 | | 7 |
| | | A | | 4 | 2 | | W | | 0 | 1 | 2 | | | 5 | 6 | |
| C | | A | | 4 | 2 | 1 | X | | 0 | 1 | 2 | | | 5 | 6 | 7 |
| C | | A | 8 | | | | Y | | 0 | 1 | 2 | | 4 | | | |
| | | A | 8 | | | 1 | Z | | 0 | 1 | 2 | | 4 | | | 7 |
| C | | | 8 | | 2 | | 0 | | 0 | 1 | 2 | 3 | | | | |
| | | | | | | 1 | 1 | | 0 | 1 | 2 | 3 | | | | 7 |
| | | | | | 2 | | 2 | | 0 | 1 | 2 | 3 | | | 6 | |
| C | | | | | 2 | 1 | 3 | | 0 | 1 | 2 | 3 | | | 6 | 7 |
| | | | | 4 | | | 4 | | 0 | 1 | 2 | 3 | | 5 | | |
| C | | | | 4 | | 1 | 5 | | 0 | 1 | 2 | 3 | | 5 | | 7 |
| C | | | | 4 | 2 | | 6 | | 0 | 1 | 2 | 3 | | 5 | 6 | |
| | | | | 4 | 2 | 1 | 7 | | 0 | 1 | 2 | 3 | | 5 | 6 | 7 |
| | | | 8 | | | | 8 | | 0 | 1 | 2 | 3 | 4 | | | |
| C | | | 8 | | | 1 | 9 | | 0 | 1 | 2 | 3 | 4 | | | 7 |

What is claimed is:

1. A data processing system comprising,
   a plurality of hardware registers,
   a plurality of data busses interconnecting said registers,
   an arithmetic unit selectively responsive to said registers,
   a read only storage control system for controlling the flow of data between said registers and said arithmetic unit in a substituted mode of operation,
   a storage circuit connected to at least one of said data busses,
   an unnatural object program stored in said storage circuit, and
   a plurality of conversion tables being stored in said storage circuit whereby, said unnatural object program is executed by said control system with reference to said conversion tables.

2. A data processing system comprising
   a plurality of interim storage means,
   a plurality of data busses interconnecting said storage means,
   an arithmetic means responsive to some of said storage means,
   a read only storage means for controlling the flow of data between said interim storage means and said arithmetic unit in an unnatural mode of operation,
   permanent storage means connected to at least one of said data busses,
   an unnatural object program stored in said permanent storage means, a plurality of conversion tables being stored in said storage circuit, and means responsive to said object program and one of said conversion tables for addressing said permanent storage means whereby, said unnatural object program is executed by said read only storage means.

3. A data processing system comprising a plurality of interim storage registers, a plurality of data busses interconnecting said storage registers, an arithmetic means responsive to some of said storage registers, permanent storage means connected to one of said data busses, an unnatural object program stored in said permanent storage means, a storage control system for controlling the flow of data between said interim storage means and said arithmetic unit so as to emulate the operation of a processor normally responsive to said object program, a plurality of conversion tables being stored in said permanent storage means, an address conversion table and an operation code recognition table forming a portion of said conversion tables, means responsive to said object program and said address conversion table for addressing said permanent storage means, and means responsive to said object program and said recognition table for handling a portion of said object program whereby, said unnatural object program is executed by said described combination in a substituted mode of operation.

4. A data processing system as recited in claim 3, and further including a character conversion table stored in said permanent storage means, means responsive to said table for converting a character represented in a first format into a second format, means responsive to said table for reconverting said character in said second format into said first format, and said object program having access to said conversion table for changing a data character into a format responsive to said object program whereby, said format materially increases the speed at which a portion of the object program can be executed.

5. A data processing system for the handling of data in successive operations comprising, a plurality of hardware registers for use as interim storage locations for data, a plurality of data buses interconnecting said registers for conveying data, an arithmetic unit selectively responsive to said registers, a storage control system for controlling the flow of data between said registers and said arithmetic unit in a substituted mode of operation by decoding successive control words and including, first storage means for storing a plurality of addressable control word groups and each group being employed to control the performance of at least one operation, a first signal controlled means for addressing an initial control word in each of said groups, a second storage means connected to at least one of said data buses, an unnatural object program employing a plurality of operation codes being stored in said second storage means, second signal controlled means for retrieving a selected one of said operation codes, a plurality of conversion tables being stored in said second storage means including an operation code conversion table, and said operation code conversion table being stored at individually addressable locations in said storage circuit and said operation code conversion table comprises second address indicia reference to said first storage means and employed by said first signal controlled means for accessing a corresponding one of said control word groups.

6. A data processing system for the handling of data in successive operations and including a plurality of hardware registers for use as interim storage locations of data, a plurality of data buses interconnecting said registers for conveying data, an arithmetic logic unit selectively responsive to said registers, and a first control system for processing data by controlling the flow of data between registers and arithmetic logic unit in a normal mode of operation by decoding successive control words retrieved from an integral first storage means, a substituted control system for controlling the flow of data between the registers and the arithmetic logic unit in a substituted mode of operation, comprising, second storage means connected to at least one of said data buses, an unnatural object program employing a plurality of operation codes being stored in said second storage means and each of said operation codes being individually addressable, a plurality of conversion tables being stored in said second storage means and including an operation code conversion table, said operation code conversion table further comprising a plurality of conversion factors and each of said factors being stored in individually addresable locations in said second storage means, first signal control means for retrieving a selected one of said operation codes and one of said conversion factors, and said retrieved operation code being unexecutable by the first control system and being employed by said first signal control means for designating and retrieving a selected one of said conversion factors.

7. In a data processing system for a handling of data in successive operations and including a plurality of hardware registers for use as interim storage locations of data, a plurality of data buses interconnecting said registers for conveying data, an arithmetic logic unit selectively responsive to said registers, and a first control system for processing data by controlling the flow of data between the registers and the arithmetic logic unit in the normal mode of operation by decoding successive control words retrieved from the integral first storage means, a substituted control system for controlling the flow of data between the registers and the arithmetic unit in a substitutive mode of operation, comprising, second storage means connected to at least one of said data buses, an unnatural object program employing a plurality of operation codes being stored in said second storage means and each of said operation codes being individually addressable, a plurality of conversion tables being stored in said second storage means including an operation code conversion table. said operation code conversion table further comprising a plurality of conversion factors and each of said factors being stored in individually addressable locations in said second storage means, first means for retrieving a selected one of said operation codes and said conversion factors, first selection means including said first means for retrieving a selected one of said operation codes, and second selection means including said first means responsive to said selected operation code for retrieving a corresponding conversion factor.

8. A data processing system for the handling of data in successive operations, comprising, a plurality of hardware registers for use as interim storage locations for data, a plurality of data buses interconnecting said registers for conveying data, an arithmetic unit selectively responsive to said registers, a control system for controlling the flow of data between said registers and said arithmetic unit in a flexible mode of operation by decoding successive control words and including a plurality of distinct storage areas and each area being employed for storing a plurality of addressable control word groups and each group being employed to control the performance of at least one system operation, a second storage means connected to at least one of said data buses, a pluraltiy of unnatural object programs being resident in said second storage means and each of said object programs employing a plurality of operation codes, and each operation code being unexecutable by the first control system which controls the operation of the system in the natural mode of operation and means responsive to the interrogated operation code for selecting a corresponding signal control group in one of said plurality of distinct storage areas for executing the selected operation code.

References Cited

UNITED STATES PATENTS

| | | | |
|---|---|---|---|
| 3,297,999 | 1/1967 | Shimabukurd ______ | 340—172.5 |
| 3,292,155 | 12/1966 | Neilson ___________ | 340—172.5 |
| 3,245,047 | 4/1966 | Blaauw et al. _______ | 340—172.5 |
| 3,222,649 | 12/1965 | King et al. ________ | 340 172.5 |

ROBERT C. BAILEY, *Primary Examiner.*

G. SHAW, *Assistant Examiner.*